United States Patent
Lee et al.

(10) Patent No.: US 9,757,715 B2
(45) Date of Patent: Sep. 12, 2017

(54) COMPOSITE PHOTOCATALYST, MANUFACTURING METHOD THEREOF, KITS CONTAINING COMPOSITE PHOTOCATALYST, AND BACTERICIDE PHOTOCATALYST

(71) Applicant: National Tsing Hua University, Hsinchu (TW)

(72) Inventors: Kuan-Ting Lee, Hsinchu (TW); Shih-Yuan Lu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 15/014,035

(22) Filed: Feb. 3, 2016

(65) Prior Publication Data

US 2017/0144135 A1    May 25, 2017

(30) Foreign Application Priority Data

Nov. 20, 2015  (TW) .............................. 104138394 A

(51) Int. Cl.
*C02F 1/32* (2006.01)
*C02F 1/72* (2006.01)
(Continued)

(52) U.S. Cl.
CPC ........... *B01J 23/8953* (2013.01); *B01J 23/42* (2013.01); *B01J 23/80* (2013.01); *B01J 23/8906* (2013.01);
(Continued)

(58) Field of Classification Search
CPC ... B01J 23/42; B01J 23/50; B01J 23/56; B01J 23/74; B01J 23/745; B01J 23/75;
(Continued)

(56) References Cited

U.S. PATENT DOCUMENTS 9,044,746 B2 * 6/2015 Podlaha-Murphy ... B01J 21/063
9,561,493 B2 * 2/2017 Subramanian ......... B82Y 30/00
(Continued)

FOREIGN PATENT DOCUMENTS

CN    100525905    8/2009
CN    101653728    2/2010
(Continued)

OTHER PUBLICATIONS

Lee et al., "Pt coupled ZnFe2O4 nanocrystals as a breakthrough photocatalyst for Fenton-like processes—photodegradation treatments from hours to seconds," Journal of Materials Chemistry A, Aug. 4, 2015, pp. 1-9.
(Continued)

*Primary Examiner* — Cam N. Nguyen
(74) *Attorney, Agent, or Firm* — Jianq Chyun IP Office

(57) ABSTRACT

A composite photocatalyst, a manufacturing method thereof, the kits including the composite photocatalyst, and a bactericide photocatalyst. A composite photocatalyst includes photocatalyst nanocrystals and platinum nanocrystals. The photocatalyst nanocrystals include a compound represented by the following chemical formula (1):

$$A^{2+}(B^{3+})_2X_4 \qquad \text{chemical formula (1),}$$

wherein $A^{2+}$ represents $Zn^{2+}$, $Cu^{2+}$, $Fe^{2+}$, $Mn^{2+}$, $Ni^{2+}$, $Co^{2+}$ or $Ag_2^{2+}$; $B^{3+}$ represents $Fe^{3+}$, $Mn^{3+}$ or $Cr^{3+}$; and X represents $O^{2-}$.

19 Claims, 10 Drawing Sheets

(51) Int. Cl.

| | |
|---|---|
| *B01J 23/42* | (2006.01) |
| *B01J 23/50* | (2006.01) |
| *B01J 23/56* | (2006.01) |
| *B01J 23/652* | (2006.01) |
| *B01J 23/656* | (2006.01) |
| *B01J 23/68* | (2006.01) |
| *B01J 23/74* | (2006.01) |
| *B01J 23/745* | (2006.01) |
| *B01J 23/75* | (2006.01) |
| *B01J 23/755* | (2006.01) |
| *B01J 23/80* | (2006.01) |
| *B01J 23/86* | (2006.01) |
| *B01J 23/889* | (2006.01) |
| *B01J 23/89* | (2006.01) |
| *B01J 35/00* | (2006.01) |
| *B01J 35/02* | (2006.01) |
| *C02F 101/30* | (2006.01) |

(52) U.S. Cl.
CPC ......... *B01J 35/004* (2013.01); *B01J 35/0013* (2013.01); *B01J 35/023* (2013.01); *C02F 1/32* (2013.01); *C02F 1/725* (2013.01); *C02F 2101/30* (2013.01); *C02F 2305/10* (2013.01)

(58) Field of Classification Search
CPC .. B01J 23/755; B01J 23/6522; B01J 23/6562; B01J 23/685; B01J 23/688; B01J 23/80; B01J 23/86; B01J 23/864; B01J 23/866; B01J 23/868; B01J 23/8892; B01J 23/89; B01J 23/8906; B01J 23/8913; B01J 23/892; B01J 23/8926; B01J 23/8953; B01J 23/8986; B01J 35/004; B01J 35/023; C02F 1/32; C02F 1/725

See application file for complete search history.

(56) References Cited

U.S. PATENT DOCUMENTS

| | | | |
|---|---|---|---|
| 2013/0079577 A1* | 3/2013 | Ingram | ............ C01G 19/02 585/733 |
| 2014/0235736 A1 | 8/2014 | Yoon | |
| 2014/0305874 A1 | 10/2014 | Stein | |
| 2015/0090660 A1 | 4/2015 | Dotson | |

FOREIGN PATENT DOCUMENTS

| | | |
|---|---|---|
| CN | 101815563 | 8/2010 |
| CN | 102744067 | 10/2012 |
| TW | 201242664 | 11/2012 |
| TW | 201249535 | 12/2012 |
| TW | I485114 | 5/2015 |

OTHER PUBLICATIONS

Lee et al., "SnO2 Quantum Dots Synthesized with a Carrier Solvent Assisted Interfacial Reaction for Band-Structure Engineering of TiO2 Photocatalysts," J. Phys. Chem. C, Jun. 2014, pp. 14457-14463.

Lee et al., "A cost-effective, stable, magnetically recyclable photocatalyst of ultra-high organic pollutant degradation efficiency: SnFe2O4 nanocrystals from a carrier solvent assisted interfacial reaction process," J. Mater. Chem. A, May 5, 2015, pp. 12259-12267.

"Office Action of Taiwan Counterpart Application," dated Apr. 27, 2016, p. 1-p. 6, in which the listed references were cited.

Kuan-Ting Lee et al., "kit for wastewater treatment, and manufacturing method for and use of photocatalyst", unpublished U.S. Appl. No. 14/671,219, filed Mar. 27, 2015.

Kuan-Ting Lee et al., "Kit for Wastewater Treatment, and Method for Manufacturing Photocatalyst and Use Thereof," unpublished Taiwan application No. 103135208, filed on Oct. 9, 2014, pp. 1-35.

* cited by examiner

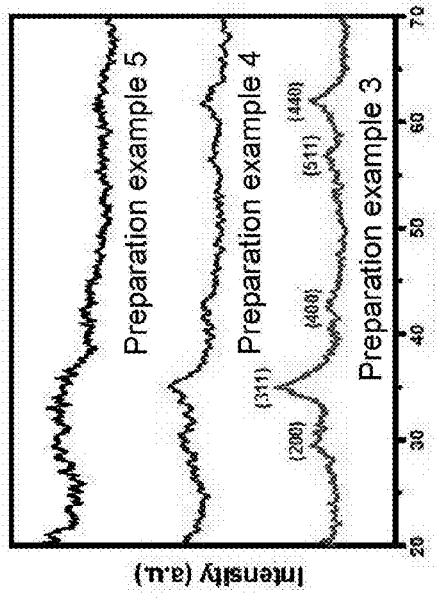
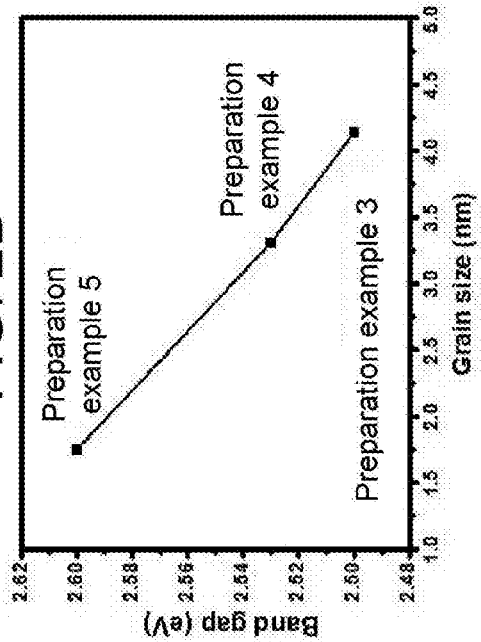
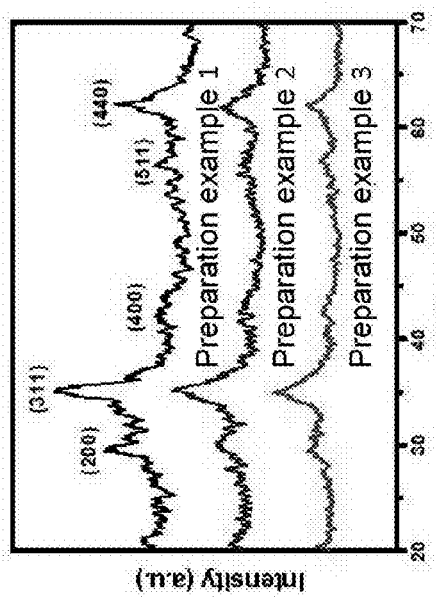
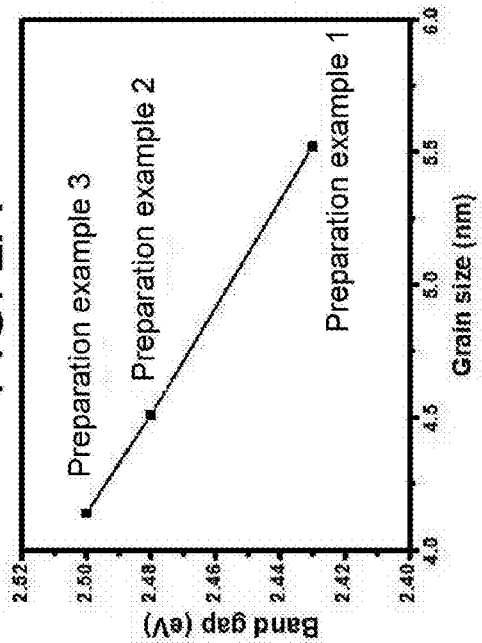
FIG. 2A
FIG. 2B
FIG. 2C
FIG. 2D

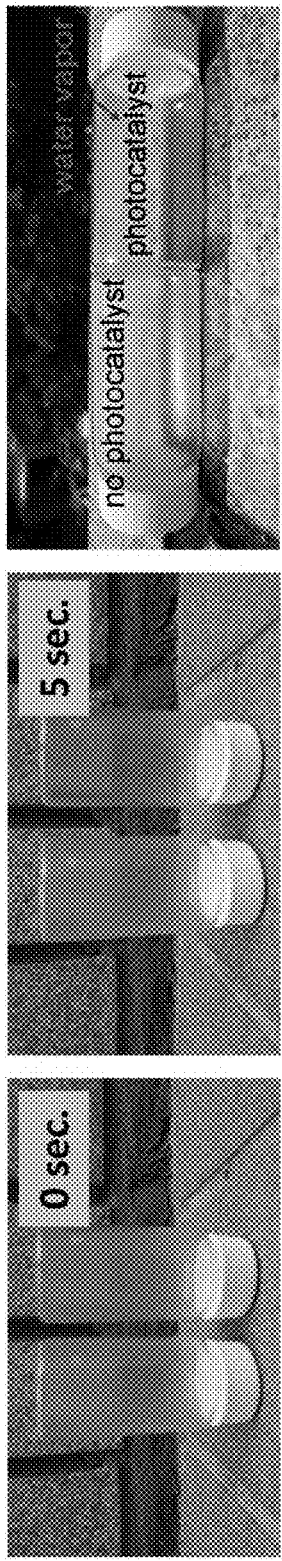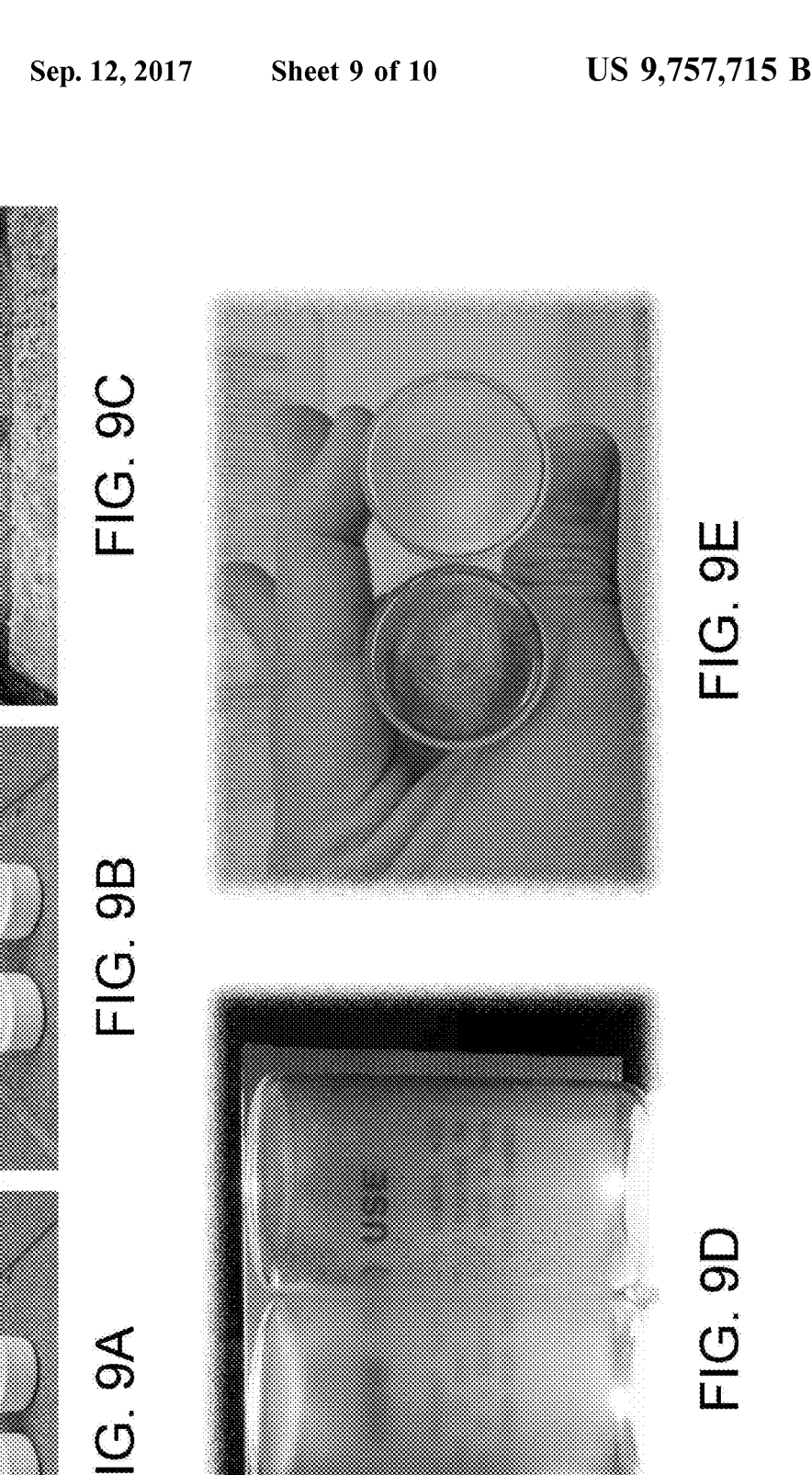
FIG. 9A  FIG. 9B  FIG. 9C  FIG. 9D  FIG. 9E

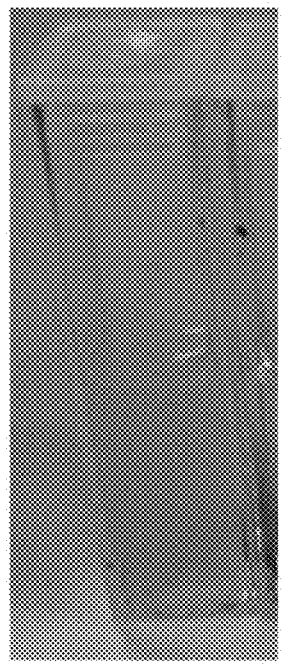 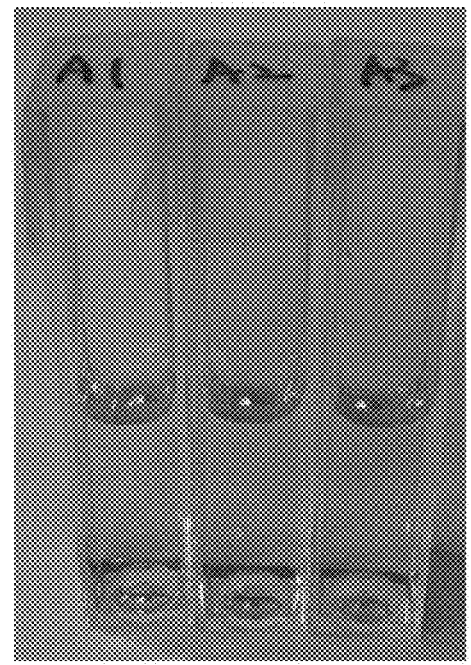
FIG. 10A    FIG. 10B
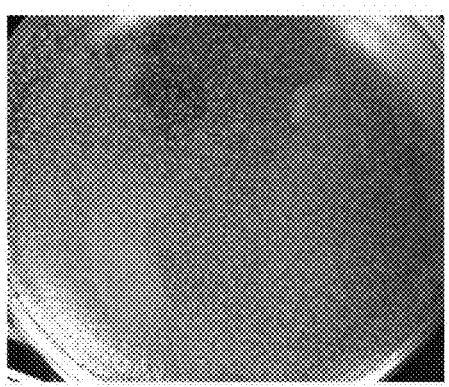 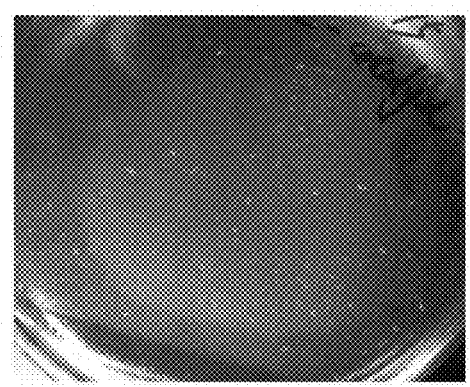
FIG. 10C    FIG. 10D

COMPOSITE PHOTOCATALYST, MANUFACTURING METHOD THEREOF, KITS CONTAINING COMPOSITE PHOTOCATALYST, AND BACTERICIDE PHOTOCATALYST

CROSS-REFERENCE TO RELATED APPLICATION

This application claims the priority benefit of Taiwan application serial no. 104138394, filed on Nov. 20, 2015. The entirety of the above-mentioned patent application is hereby incorporated by reference herein and made a part of this specification.

BACKGROUND OF THE INVENTION

1. Field of the Invention

The invention relates to a photocatalyst, and particularly relates to a composite photocatalyst, a manufacturing method thereof, a kit containing composite photocatalyst, and a bactericide photocatalyst.

2. Description of Related Art

Water scarcity is one of the top ten environmental issues faced by mankind in the 21st century. Wastewater recycling is one possible way to handle the water shortage problem, but effective treating methods for wastewater or sewage are especially needed. Theoretically, the wastewater treating methods can be divided into three categories by its principles: physical treatments, chemical treatments and biological treatments. Various wastewater treatment technologies, such as active carbon adsorption, chemical oxidation, biological treatments, ion exchange and thin film processes, are currently available. Chemical oxidation treatments are commonly used in the industries. Depending on the types of the oxidizing agents used, chemical oxidation treatments can be divided into four categories: air oxidation processes, ozone oxidation processes, chemical agent oxidation processes and advanced oxidation processes (AOP). The advanced oxidation processes recently draw a lot attentions because such treatment is not limited by the pollutant concentration(s) and has fast reaction rates. The main procedure of the advanced oxidation treatment is to generate hydroxyl free radicals of high oxidative capability to oxidize organic pollutants or materials for the removal of pollutants.

However, further improvements are needed for the currently used advanced oxidation processes, such as Fenton processes, ozone oxidation processes, high-efficiency electrolytic oxidation processes, wet oxidation processes or the photo-oxidation processes using titanium oxide ($TiO_2$). Taking Fenton processes as the example, the iron sludge resulted from such processes is difficult to recycle and may lead to environmental pollutions. For the photo-oxidation processes using titanium oxide ($TiO_2$), since $TiO_2$ only absorbs lights in the ultraviolet wavelength for further reaction, such processes will be limited by the irradiation light wavelengths and the general light sources cannot be used, leading to very limited applications and ineffective results.

SUMMARY OF THE INVENTION

The invention provides a composite photocatalyst, which is effective and environmental friendly. Such photocatalyst can rapidly degrade pollutants and be easily recycled without contamination as no sludge is produced by using such photocatalyst. Furthermore, the photocatalytic reaction of the composite photocatalyst of the invention may be triggered by the absorption of the visible light and the composite photocatalyst can rapidly decompose carbon, hydrogen and/or oxygen-containing organic pollutants and provide good catalytic effects. The composite photocatalyst of the invention offers high stability and low or no secondary pollution risks as such photocatalyst can be repeatedly used and recycled and no sludge is generated.

According to the embodiments of the invention, a composite photocatalyst is provided. The composite photocatalyst includes platinum nanocrystals and photocatalyst nanocrystals. The photocatalyst nanocrystal comprises a compound of the following chemical formula (1):

$$A^{2+}(B^{3+})_2 X_4 \qquad \text{Chemical formula (1)}$$

wherein $A^{2+}$ represents $Zn^{2+}$, $Sn^{2+}$, $Cu^{2+}$, $Fe^{2+}$, $Mn^{2+}$, $Ni^{2+}$, $Co^{2+}$ or $Ag_2^{2+}$, $B^{3+}$ represents $Fe^{3+}$, $Mn^{3+}$ or $Cr^{3+}$, X represents $O^{2-}$, the composite photocatalyst absorbs a light in the visible light wavelength range to catalyze photo-catalysis, decomposition and degradation of an organic material containing carbon, hydrogen and oxygen.

According to the embodiments of the invention, a method of manufacturing a composite photocatalyst is provided. At least a first solution containing the photocatalyst nanocrystals is mixed with a second solution containing platinum nanocrystals. The photocatalyst nanocrystal includes a compound of the following chemical formula (1):

$$A^{2+}(B^{3+})_2 X_4 \qquad \text{Chemical formula (1)}$$

wherein $A^{2+}$ represents $Zn^{2+}$, $Sn^{2+}$, $Cu^{2+}$, $Mn^{2+}$, $Ni^{2+}$, $Co^{2+}$ or $Ag_2^{2+}$, $B^{3+}$ represents $Fe^{3+}$, $Mn^{3+}$ or $Cr^{3+}$, X represents $O^{2-}$.

According to the embodiments of the invention, a wastewater or sewage treatment kit is provided, and the sewage treatment kit comprises the aforementioned composite photocatalyst and active oxide compounds.

According to the embodiments of the invention, a solid waste treatment kit is provided. The solid waste treatment kit includes a photocatalyst. The photocatalyst is a composite photocatalyst including platinum nanocrystals and photocatalyst nanocrystals or the photocatalyst includes photocatalyst nanocrystals. The photocatalyst absorbs a light in the visible light wavelength range to catalyze photo-catalysis, decomposition and degradation of an organic material containing carbon, hydrogen and oxygen. The photocatalyst nanocrystal includes a compound of the following chemical formula (1)

$$A^{2+}(B^{3+})_2 X_4 \qquad \text{Chemical formula (1)}$$

wherein $A^{2+}$ represents $Zn^{2+}$, $Sn^{2+}$, $Cu^{2+}$, $Fe^{2+}$, $Mn^{2+}$, $Ni^{2+}$, $Co^{2+}$ or $Ag_2^{2+}$, $B^{3+}$ represents $Fe^{3+}$, $Mn^{3+}$ or $Cr^{3+}$, X represents $O^{2-}$.

According to the embodiments of the invention, a gas processing kit is provided. The gas processing kit includes a photocatalyst. The photocatalyst is a composite photocatalyst including platinum nanocrystals and photocatalyst nanocrystals or the photocatalyst includes photocatalyst nanocrystals. The photocatalyst absorbs a light in the visible light wavelength range to catalyze photo-catalysis, decomposition and degradation of an organic material containing carbon, hydrogen and oxygen. The photocatalyst nanocrystal includes a compound of the following chemical formula (1)

$$A^{2+}(B^{3+})_2 X_4 \qquad \text{Chemical formula (1)}$$

wherein $A^{2+}$ represents $Zn^{2+}$, $Sn^{2+}$, $Cu^{2+}$, $Fe^{2+}$, $Mn^{2+}$, $Ni^{2+}$, $Co^{2+}$ or $Ag_2^{2+}$, $B^{3+}$ represents $Fe^{3+}$, $Mn^{3+}$ or $Cr^{3+}$, X represents $O^{2-}$.

According to the embodiments of the invention, a bactericide photocatalyst is provided. The bactericide photocatalyst is a composite photocatalyst including platinum nanocrystals and photocatalyst nanocrystals or the bactericide photocatalyst includes photocatalyst nanocrystals. The photocatalyst nanocrystal comprises $Ag_2Fe_2O_4$.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A to FIG. 2D show the XRD measurement results of the photocatalyst prepared in Preparation examples 1-5 of the invention.

FIG. 9A to FIG. 9E show the processing results of the gas processing kit in some embodiments of the invention.

FIG. 10A to FIG. 10D show the bactericide effect evaluation results of the bactericide photocatalyst in some embodiments of the invention.

DESCRIPTION OF THE EMBODIMENTS

Figure 1:
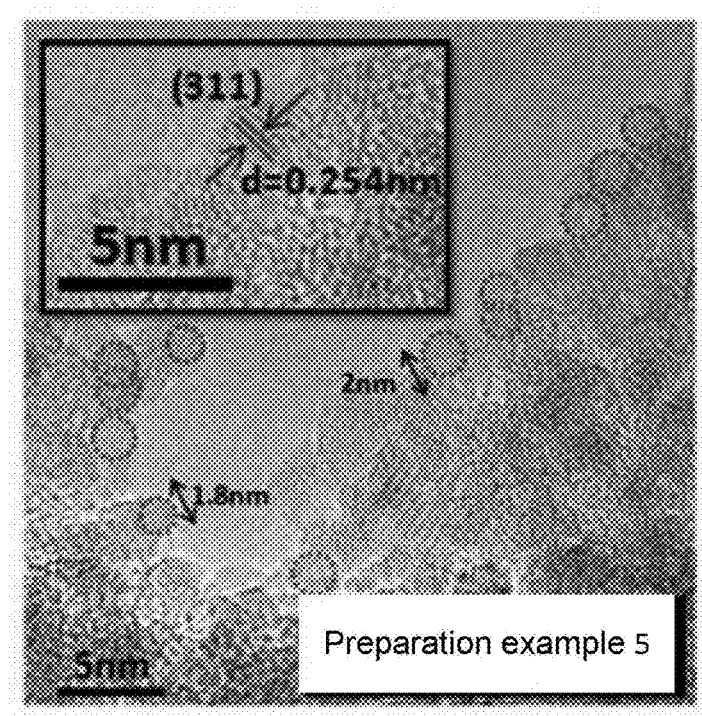
FIG. 1 shows the TEM image(s) of the photocatalyst nanocrystals prepared in Example 5 of the invention.

In the invention, platinum (Pt) nanocrystals are selectively added to modify the photocatalyst nanocrystals that can absorb the visible light to generate catalytic effects, so as to obtain a composite photocatalyst. The composite photocatalyst of the invention can degrade pollutants rapidly without generate additional wastes, and the composite photocatalyst absorbs the visible light (the light in the visible light wavelength range) to generate excellent photo-degradation effects of organic materials containing carbon, hydrogen, and/or oxygen.

Manufacturing of the Composite Photocatalyst

The invention provides a composite photocatalyst including photocatalyst nanocrystals and platinum nanocrystals. The manufacturing method of the composite photocatalyst includes mixing a first solution containing the photocatalyst nanocrystals with a second solution containing platinum nanocrystals. The molar ratio of platinum contained in the second solution and the metal A contained in the photocatalyst nanocrystals in the first solution ranges from 0.01:1 to 0.2:1.

The photocatalyst nanocrystal includes a compound of the following chemical formula (1):

$$A(B^{3+})_2X_4 \qquad \text{Chemical formula (1)}$$

In Chemical formula (1), represents $Zn^{2+}$, $Sn^{2+}$, $Cu^{2+}$, $Fe^{2+}$, $Mn^{2+}$, $Ni^{2+}$, $Co^{2+}$ or $Ag_2^{2+}$, $B^{3+}$ represents $Fe^{3+}$, $Mn^{3+}$ or $Cr^{3+}$, X represents $O^{2-}$.

When $A^{2+}$ is $Fe^{2+}$ and $B^{3+}$ is $Fe^{3+}$, the compound is $Fe_3O_4$. When $A^{2+}$ is $Mn^{2+}$ and $B^{3+}$ is $Mn^{3+}$, the compound is $Mn_3O_4$.

According to an embodiment of the invention, the preferred compound of the chemical formula (1) is a compound which has spinel crystal structure (spinel structure), and the spinel crystal structure includes the normal spinel structure or the inverse spinel structure.

According to an embodiment of the invention, when A and/or B is preferably a magnetic element, the photocatalyst nanocrystals have ferromagnetism. Hence, the magnet collection means may be used to collect the composite photocatalyst for reuses. The applicable magnets may be permanent magnets or electromagnets.

In an embodiment of the invention, $A^{2+}$ represents $Zn^{2+}$, $B^{3+}$ represents $Fe^{3+}$.

In another embodiment of the invention, $A^{2+}$ represents $Ag_2^{2+}$, $B^{3+}$ represents $Fe^{3+}$.

The preparation method of the photocatalyst nanocrystals includes dissolving first and second metal precursors in the first solvent to form a precursor solution. The first metal contained in the first metal precursor includes Zn, Sn, Cu, Fe, Mn, Ni, Co, or Ag. The second metal contained in the second metal precursor includes Fe, Mn or Cr. In an embodiment of the invention, the first metal is Zn, and the first metal precursor is $Zn(ClO_4)_2$, the second metal is Fe, and the second metal precursor is a trivalent iron compound. The trivalent iron compound may be $Fe(NO)_3$, for example. In another embodiment of the invention, the first metal is Ag, and the first metal precursor is $AgNO_3$, the second metal is Fe, and the second metal precursor is a trivalent iron compound. The trivalent iron compound may be $Fe(NO)_3$.

Next, the second solvent is added to the precursor solution and uniformly mixed with the precursor solution to form a first mixture solution. The first solvent is miscible with the second solvent. After that, the third solvent is added to the first mixture solution to form a layered solution, wherein the third solvent is immiscible with the second solvent, and the affinity between the first solvent and the third solvent is greater than the affinity between the second solvent and the first solvent. In an embodiment of the invention, in the layered solution, the third solvent is located at the upper layer of the layered solution, and the first solvent is located at the bottom layer of the layered solution.

Then the layered solution is stirred, so the precursor solution contained in the mixture solution is dissolved in the third solvent to form a second mixture solution containing the photocatalyst nanocrystals. After the second mixture solution is centrifuged, the photocatalyst nanocrystals are obtained.

Preparation of Photocatalyst Nanocrystals

Preparation Examples 1 to 5

Referring to the concentrations and ingredients shown in the following Table 1, the samples having the $Zn(ClO_4)_2$ solution as the organic phase and the NaOH solution as the aqueous phase are prepared. The photocatalyst nanocrystal samples of Preparation examples 1 to 5 are prepared by using $Zn(ClO_4)_2$ solutions in different concentrations of 0.0472M, 0.0236M, 0.0118M and NaOH solutions in different concentrations of 0.4 M, 0.8 M, 2.0 M. $Zn(ClO_4)_2$ and $Fe(NO)_3$ are dissolved in 22.5 ml of ethanol, and the molar ratio of Zn ions and Fe ions is 1:2. The organic phase is prepared by adding 3.75 ml of the ethanol solution having $Zn(ClO_4)_2$ and $Fe(NO)_3$ dissolved therein to 3.75 ml of chloroform. The aqueous phase is prepared by dissolving NaOH in 22.5 ml of distilled water. Then, the aqueous phase is dropped into the organic phase alongside the inner wall of the container to form the layered interfacial reaction system. In the layered interfacial reaction system, the aqueous phase is located at the upper layer and the organic phase is located at the bottom layer. The interfacial reaction system keeps stirring at the room temperature for 30 minutes for reaction. When the reaction is completed, the solution at the upper layer is collected and centrifuged to obtain precipitates. Then, the precipitates are repeatedly cleaned with appropriate amounts of ethanol and deionizer water and then centrifuged and collected. The pH value is confirmed to be 7, and the obtained product is dried at 80° C. overnight to obtain the product $ZnFe_2O_4$ photocatalyst nanocrystals. The products of photocatalyst nanocrystals prepared according to the Preparation examples are analysed using transmission electron microscopy (TEM) to analyze their particle sizes and crystal characteristics. The concentrations of $Zn(ClO_4)_2$ and NaOH used in various Preparation examples, and the particle sizes of the obtained products $ZnFe_2O_4$ photocatalyst nanocrystals are shown in Table 1. FIG. 1 shows the TEM image(s) of the obtained photocatalyst nanocrystals prepared in Preparation example 5, and the particle sizes of the nanocrystals were observed to be 1.8 nm~2.0 nm. The particle size(s) of $ZnFe_2O_4$ photocatalyst nanocrystals may be measured by X-ray diffraction (XRD). The XRD measurement results of the nanocrystals obtained from Preparation examples 1 to 5 are shown in FIG. 2A to FIG. 2D.

The aforementioned preparation examples describe the preparation of $ZnFe_2O_4$ photocatalyst nanocrystals as an example, but the preparation processes and types of the photocatalyst nanocrystals of the invention are not limited to the examples described herein, the photocatalyst nanocrystals of the invention can be any suitable photocatalyst nanocrystals which have the spinel structure. The particle sizes of the photocatalyst nanocrystals of the invention described herein range generally from about 1 nm to about 10 nm.

Degradation Effects of the Photocatalyst Nanocrystals Toward Organic Pollutants

Figure 3B:
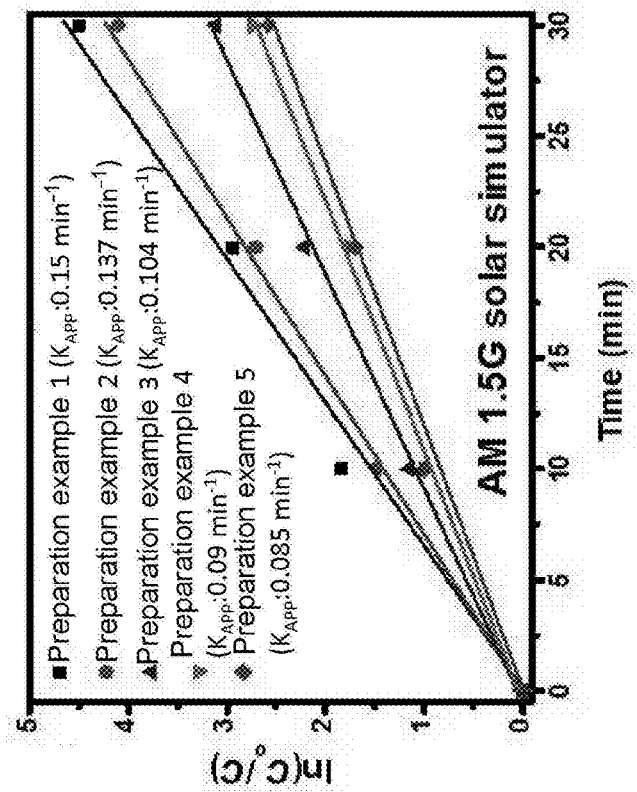
FIG. 3A and FIG. 3B are analysis chart of the photo-degradation results in the dark and under illumination of the photocatalyst prepared in Preparation examples 1-5 of the invention.
Figure 3A:
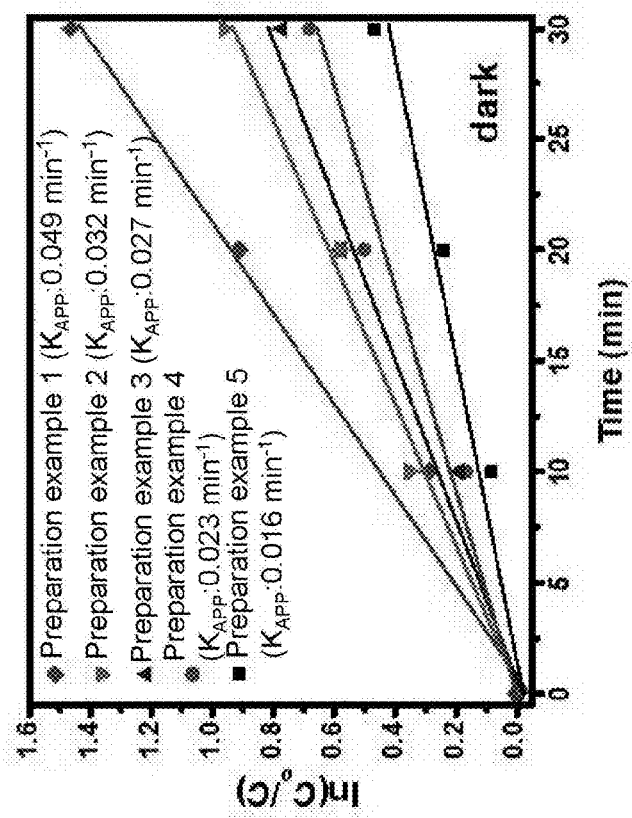

The degradation effects of the photocatalyst nanocrystals obtained from Preparation examples 1-5 toward the organic pollutants are evaluated, and the degradation abilities in the dark or under illumination are analysed. In details, the sample solutions obtained from Preparation examples 1 to 5 are prepared, and the sample solution(s) contains: $1.27 \times 10^{-4}$ M photocatalyst nanocrystals, 2.5 M hydrogen peroxide ($H_2O_2$) as the active oxide compound and rhodamine B (RhB) of a concentration 1.2 ppm as the reference pollutant. Next, the change of RhB concentration(s) in each sample solution over the time is measured and a chart using the detection time as the horizontal axis and $\ln(C_0/C)$ as the vertical axis ($C_0$: initial concentration of RhB, C: RhB concentration at the time of detection) is plotted to get the slope, which is the apparent reaction rate constant ($K_{app}$). The plots of $\ln(C_0/C)$-versus-time of Preparation examples 1 to 5 in the darkness and under illumination are shown in FIG. 3A and FIG. 3B respectively. In order to test the degradation effects of the nanocrystals obtained from Preparation examples 1 to 5 under illumination, the solar light simulator (AM1.5G solar simulator, YAMASHITA DENSO, YSS-E40; irradiation energy: 100 mW/cm$^2$) is used to irradiate the sample solutions of Preparation examples 1 to 5. The apparent reaction rate constants ($K_{app}$) of Preparation examples 1 to 5 in the darkness and under illumination for the degradation of RhB are shown in Table 1.

As shown in FIG. 3B, under the illumination or irradiation with the solar light simulator, the photo-degradation effects of the sample solutions obtained from Preparation examples 1 to 5 toward RhB is much higher than photo-degradation effect of the sample solutions in the darkness, which shows the photocatalyst nanocrystals prepared from the invention have excellent photo-degradation effects toward the reference pollutant RhB.

TABLE 1

| | Preparation example 1 | Preparation example 2 | Preparation example 3 | Preparation example 4 | Preparation example 5 |
|---|---|---|---|---|---|
| $Zn(ClO_4)_2$ concentration (M) | 0.0472 | 0.0236 | 0.0118 | 0.0118 | 0.0118 |
| NaOH concentration (M) | 0.4 | 0.4 | 0.4 | 0.8 | 2.0 |
| Particle size (nm) | 5.5 | 4.5 | 4.1 | 3.3 | 1.8 |
| Energy gap (eV) | 2.43 | 2.48 | 2.50 | 2.53 | 2.60 |
| Degradation effect of organic pollutant (in the darkness) ($K_{app}$, min$^{-1}$) | 0.016 | 0.023 | 0.027 | 0.032 | 0.049 |
| Degradation effect of organic pollutant (under illumination) ($K_{app}$, min$^{-1}$) | 0.085 | 0.090 | 0.104 | 0.137 | 0.150 |

Preparation of Platinum Nanocrystals

Figure 4:
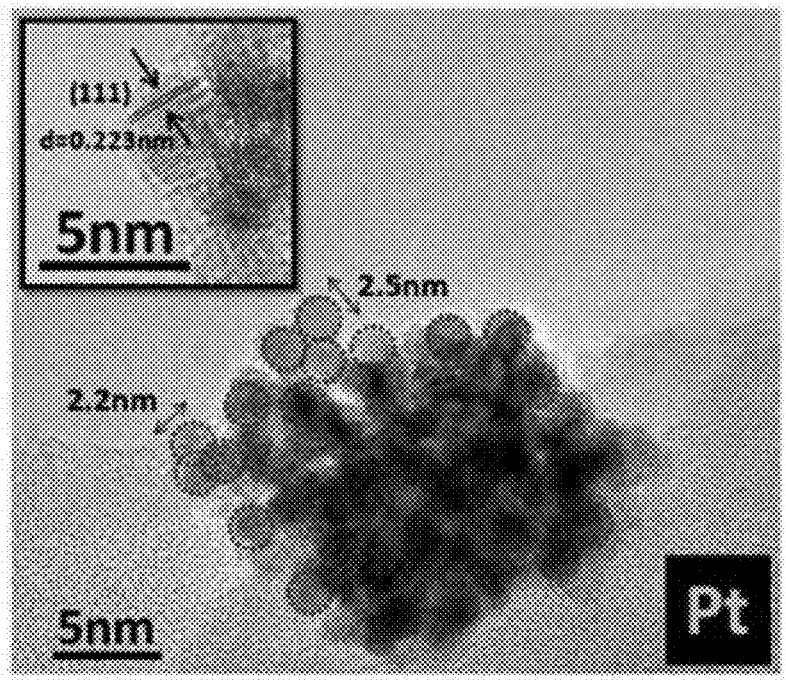
FIG. 4 shows TEM image(s) of the platinum nanocrystals of the invention.

The polyol processes are used to prepare the platinum nanocrystals. Specifically, $H_2Cl_6Pt$ is dissolved in a mixture solution of water and ethylene glycol (water: ethylene glycol=1:1 (v/v)) to prepare the precursor solution. Then, the precursor solution is heated in an oil bath under stirring, and the temperature is maintained at 125° C. for one hour. After heating, the solution is further stirred for 2 hours to obtain the platinum nanocrystal suspension solution. Then, 1M aqueous sodium hydroxide solution is added to adjust the pH of the platinum nanocrystal suspension solution to be 7. The particle size(s) of the platinum nanocrystals ranges generally from 2 nm to 3 nm. The particle size(s) and crystal characteristics of the platinum nanocrystals are analysed by tunneling electron microscope (TEM) and by X-ray diffraction spectroscopy. FIG. 4 shows the TEM images of platinum nanocrystals, and the particle size(s) of the platinum particles is observed to be between 2 nm and 2.5 nm.

Preparation of the Composite Photocatalyst and Experiment Examples 1-3

Experiment Examples 1-3

The composite photocatalyst is prepared by mixing the platinum nanocrystals and photocatalyst nanocrystals in the solution in an appropriate molar ratio. Using Pt/ZnFe$_2$O$_4$ composite photocatalyst as an example, ZnFe$_2$O$_4$ photocatalyst nanocrystals are dispersed in the distilled water to prepare the ZnFe$_2$O$_4$ photocatalyst nanocrystal suspension solution. Then, the platinum nanocrystal suspension solution (pH value set to 7) is added to the ZnFe$_2$O$_4$ photocatalyst nanocrystal suspension solution, and the mixture solution is agitated at 25° C. and 200 rpm oscillation using a shaker for 30 minutes. Afterwards, the mixture solution is centrifuged, and the collected precipitates are repeatedly cleaned with an appropriate amount of water and ethanol, centrifuged, and the collected precipitates are finally dried at 80° C. overnight to obtain the composite photocatalyst. The samples of Experiment examples 1-3 are prepared by mixing the platinum nanocrystals and ZnFe$_2$O$_4$ photocatalyst nanocrystals in different molar ratios. The ZnFe$_2$O$_4$ photocatalyst nanocrystals used and the molar ratios of Pt/Zn for Experiment examples 1-3 are shown in Table 2.

Figure 5:
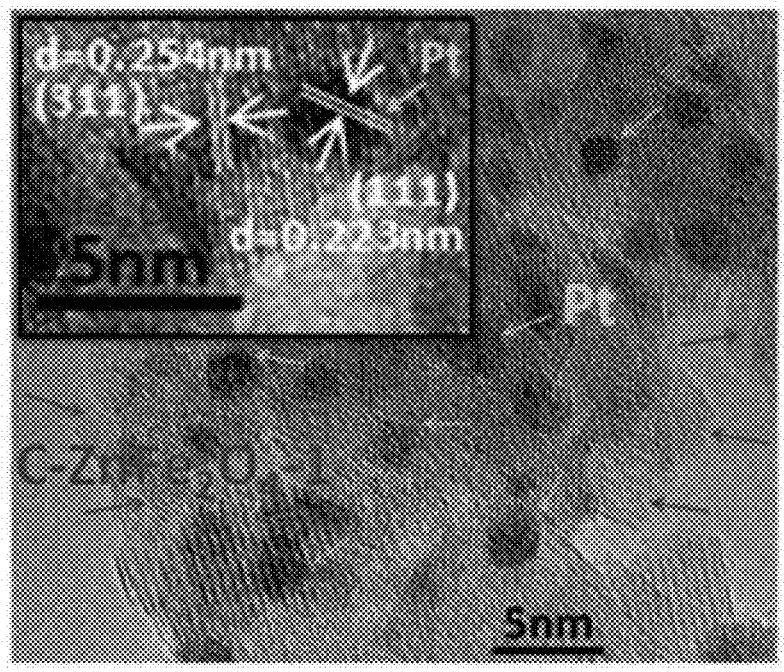
FIG. 5 shows TEM image(s) of the composite photocatalyst of Preparation example 2 of the invention.

FIG. 5 shows the TEM image(s) of the composite photocatalyst obtained from Experiment example 2, and it is observed that the platinum nanocrystals and ZnFe$_2$O$_4$ photocatalyst nanocrystals are uniformly absorbed with one another and gathered into clusters.

TABLE 2

|  | Experiment example 1 | Experiment example 2 | Experiment example 3 |
| --- | --- | --- | --- |
| ZnFe$_2$O$_4$ photocatalyst nanocrystals | Preparation example 5 | Preparation example 5 | Preparation example 5 |
| The molar ratio of Pt/Zn (%) | 2 | 6 | 10 |

Characteristics of the Composite Photocatalyst

Magnetism of Composite Photocatalyst

Figure 6:
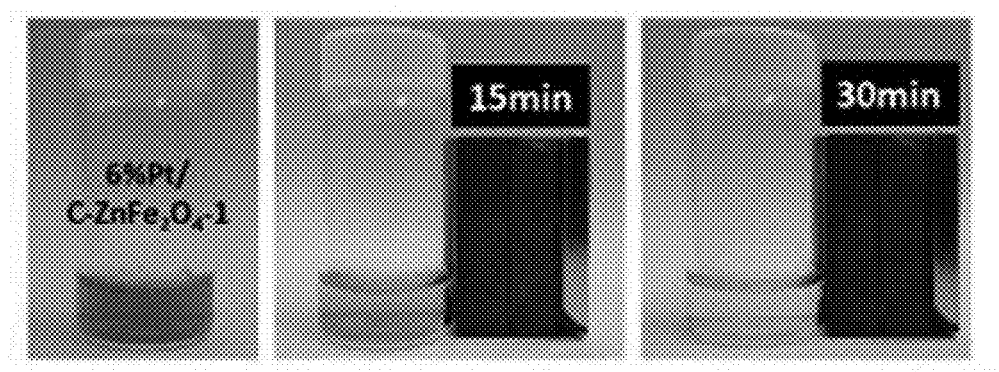
FIG. 6 shows the magnetic test results of the composite photocatalyst of the invention.

FIG. 6 shows the experimental results of the magnetic property of the composite photocatalyst. The ZnFe$_2$O$_4$ photocatalyst nanocrystal suspension solution appears with a pale yellow colour, while the platinum nanocrystal suspension solution shows a lightly brownish black colour. In theory, the platinum nanocrystals are not magnetic and not attracted to the magnet. However, the composite photocatalyst solution prepared in Experiment example 2 appears to be lightly brown as shown in the left part of FIG. 6. Afterwards, the magnet is used to attract the particles, after applying the magnet for 15 minutes (middle part of FIG. 6), the colour of the solution becomes paler, as the composite photocatalyst suspended in the solution is attracted by the magnet and gradually moves to the beaker sidewall near the magnet. After applying the magnet for 30 minutes, the composite photocatalyst suspended in a solution may be all attached to the beaker sidewall near the magnet, so the solution becomes almost colourless (transparent). The composite photocatalyst prepared in the examples of the invention is magnetic and can be attracted by the magnet, which means that platinum nanocrystals and ZnFe$_2$O$_4$ photocatalyst nanocrystals aggregate together to form the composite photocatalyst. Because these two nanocrystals are absorbed and aggregated with each other into clusters, the resultant composite photocatalyst becomes magnetic and may be easily collected by the magnet, which makes the recycling or re-usage of the composite photocatalyst easy.

Photo-degradation effects of the composite photocatalyst toward organic pollutants The photo-degradation effects of the composite photocatalyst(s) toward organic pollutants are evaluated in Experiment examples 1-3, while the photocatalyst nanocrystals obtained from the aforementioned Preparation example 5 is used as the Comparative example. Specifically, a solar simulator source (AM1.5G solar simulator, YAMASHITA DENSO, YSS-E40; irradiation energy: 100 mW/cm$^2$) is used to irradiate the sample solutions of Experiment examples 1 to 3 and the sample solution of Comparative example. The sample solution contains: $0.86 \times 10^{-4}$ M of the composite photocatalyst or the photocatalyst nanocrystals, 2.5 M H$_2$O$_2$ as the active oxide compound, and 5.0 ppm RhB as the reference organic pollutant. The concentration change of RhB in each sample solution over the time is measured to calculate the apparent reaction rate constant ($K_{app}$) to evaluate the photo-degradation effects toward the organic pollutant, and the apparent reaction rate constants of various examples are shown in Table 3.

TABLE 3

|  | Comparative example | Experiment example 1 | Experiment example 2 | Experiment example 3 |
| --- | --- | --- | --- | --- |
| $K_{app}$ (min$^{-1}$) | 0.04 | 0.10 | 1.97 | 0.79 |

From the results shown in Table 3, compared to the photocatalyst nanocrystals not complexed with platinum nanocrystals, the composite photocatalyst of the invention has much improved photo-degradation effects toward the organic pollutant. Therefore, the composite photocatalyst of the invention can rapidly degrade the pollutants without generating additional waste (such as sludge) and has excellent catalytic effects with the light absorption in the visible light wavelength range.

Photo-Degradation Effects of the Composite Photocatalyst Toward High Concentration Organic Pollutants The solar simulator source (AM1.5G solar simulator, YAMASHITA DENSO, YSS-E40; irradiation energy: 100 mW/cm$^2$) is used to irradiate the sample solutions of Experiment examples 1 to 4. The sample solutions of Experiment examples 1 to 4 contain the organic pollutant in different concentrations. The sample solutions of Experiment examples 1-4 contain: $1.72 \times 10^{-4}$ M of the composite photocatalyst of Experiment example 2, 5 M H$_2$O$_2$ as the active oxide compound, and different concentrations of RhB as the organic pollutant. The RhB concentrations of various examples are shown in Table 4. The concentration change of RhB in each sample solution over the time is measured to calculate the apparent reaction rate constant ($K_{app}$), and the apparent reaction rate constants of various examples are shown in Table 4.

TABLE 4

|  | Experiment example 1 | Experiment example 2 | Experiment example 3 | Experiment example 4 |
| --- | --- | --- | --- | --- |
| RhB concentration (ppm) | 5 | 10 | 50 | 100 |
| $K_{app}$ (min$^{-1}$) | 9.31 | 3.37 | 0.46 | 0.13 |

Figure 7:
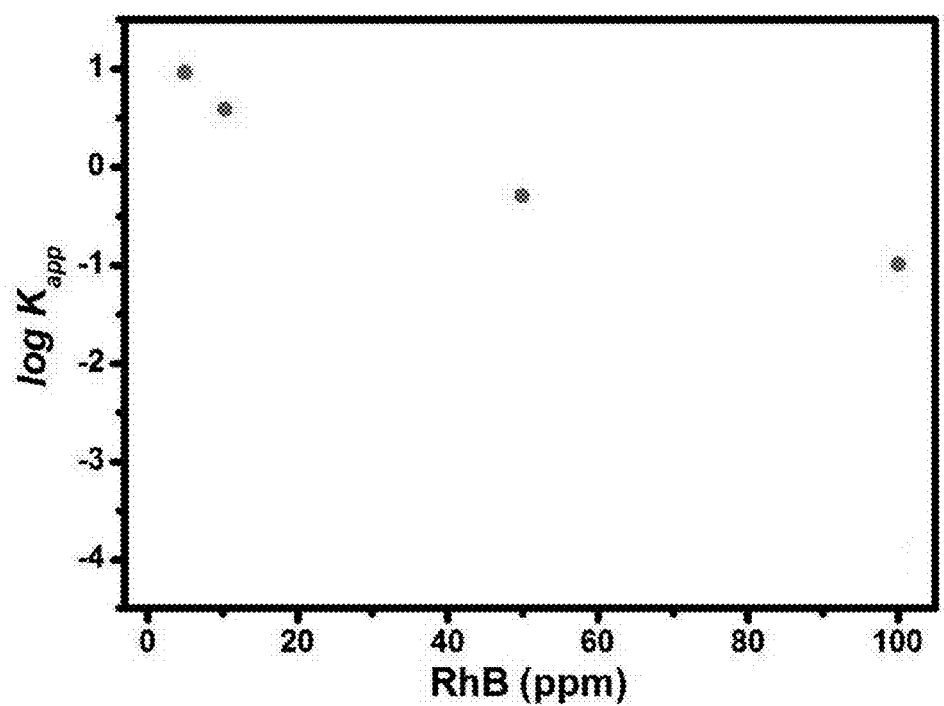
FIG. 7 illustrates the photo-degradation effects of the composite photocatalyst of the invention for the organic pollutants in different concentrations.

FIG. 7 illustrates the degradation effects of the composite photocatalyst toward the organic pollutant in different concentrations. In FIG. 7, the composite photocatalyst of the invention can maintain high degradation effects even toward the organic pollutant of high concentrations (up to 100 ppm). Under the normal pollutant concentration (e.g. 5 ppm), compared to the apparent reaction rate constant of the conventional photocatalyst material being 0.01 $min^{-1}$, the apparent reaction rate constant of the composite photocatalyst of the invention can reach 9.31 $min^{-1}$, several orders of differences in magnitude. It is evident that the composite photocatalyst of the invention have very high photo-degradation effects.

The photocatalyst nanocrystals and the prepared composite photocatalyst can be further fabricated as processing or treatment kits used for various applications, including wastewater or sewage treatment, solid waste treatment, gas processing, air purification and sterilization.

Wastewater or Sewage Treatment Kit

The wastewater treatment kit of the invention includes the above-prepared composite photocatalyst and active oxide compound(s). The active oxide compound includes peroxides, super oxides or a combination thereof, but the scope of the invention is not limited by the embodiments described herein. In one embodiment of the invention, the active oxide compound is hydrogen peroxide, but other suitable active oxide compounds may be used.

The wastewater treatment kit of the invention uses the above-mentioned composite photocatalyst, and it can rapidly degrade the contaminants without generating additional waste at the same time. Similarly, the photocatalyst of the treatment kit absorbs the visible light to generate excellent catalytic effects.

Solid Waste Treatment Kit

The solid waste treatment kit of the invention includes the above-prepared composite photocatalyst. Referring to FIG. 8A to FIG. 8E, the processing results of the solid waste treatment kit of the invention are shown. The solar simulator source (AM1.5G solar simulator, YAMASHITA DENSO, YSS-E40; irradiation energy: 100 $mW/cm^2$) is used to irradiate the sample solutions of Experiment examples 5 to 8. The ingredients and composition of the sample solutions of Experiment examples 5 to 8 are shown in Table 5. Each sample solution before irradiation with the solar simulator is shown at the left side of FIG. 8A-FIG. 8D. Each sample solution after irradiation 1 hour to 3 hours with the solar simulator is shown at the right side of FIG. 8A-FIG. 8D. From the results shown in FIG. 8A-FIG. 8D, the composite photocatalyst of the invention indeed have excellent degradation effects toward the general household wastes.

TABLE 5

| | Experiment example 5 | Experiment example 6 | Experiment example 7 | Experiment example 8 |
|---|---|---|---|---|
| Organic pollutant (types of the waste) | Long fibre cleaning paper | Thick paperboard | Cooked rice | Human urine |
| Organic pollutant content | 0.2 g | 0.2 g | 2 g | 5 ml |
| Active oxide compound | 2.5M $H_2O_2$ | | | |
| Photocatalyst | 0.86 × $10^{-4}$ M composite photocatalyst | | | |

Figure 8B:
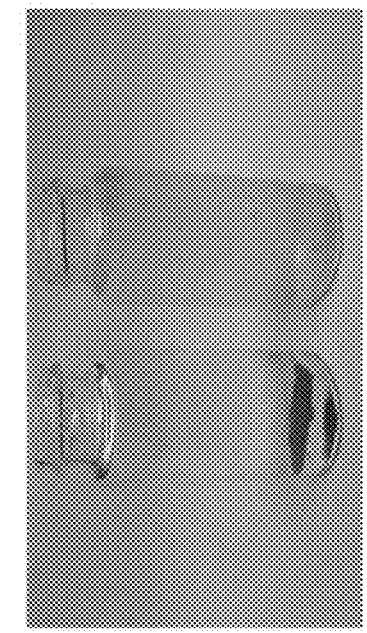
FIG. 8A to 8E show the processing results of the solid waste treatment kit in some embodiments of the invention.
Figure 8D:
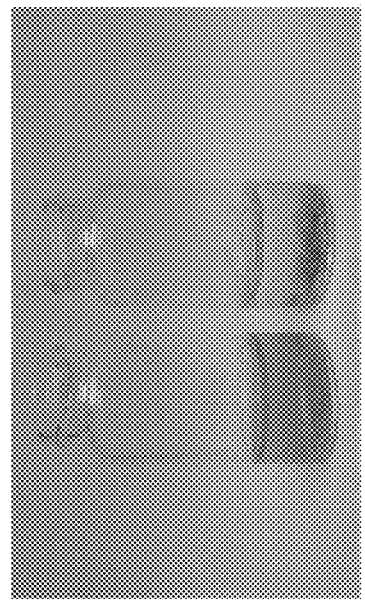
Figure 8A:
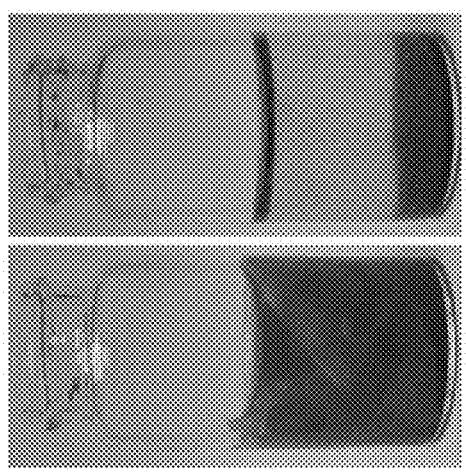
Figure 8C:
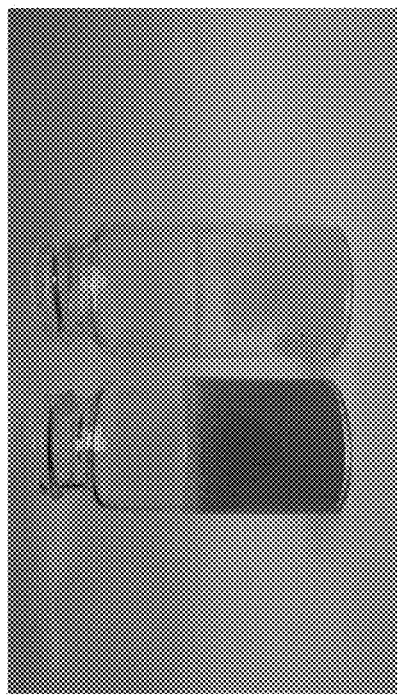
Figure 8E:
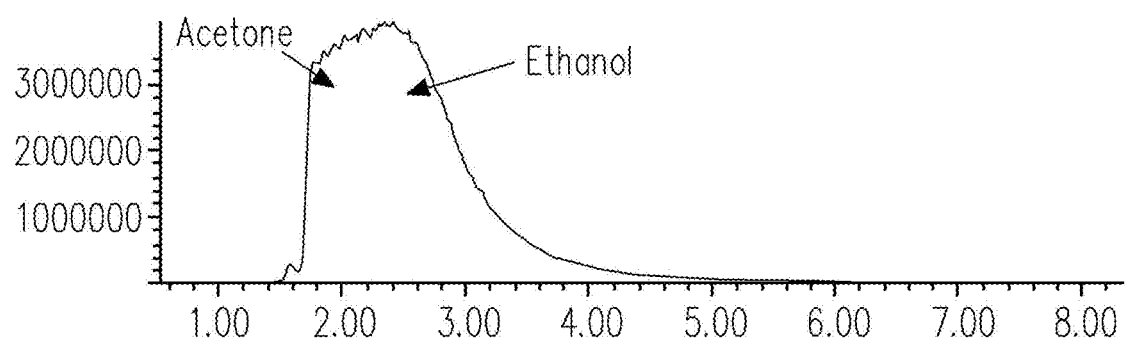

Referring to FIG. 8E, the solid waste treatment kit of the invention can decompose hydrocarbons and/or carbohydrates into a flammable liquid of low boiling points, including alkanes and/or alcohols. The results of GC-MS analysis for the sample solution of Experiment example 5 illuminated with the solar simulator source (AM1.5G solar simulator, YAMASHITA DENSO, YSS-E40; irradiation energy: 100 $mW/cm^2$) for 2 hours are shows in FIG. 8E. From the results of FIG. 8E, it is known that the liquid produced by the decomposition or treatment of the solid waste treatment kit is a low-boiling organic solution containing ethanol, acetone and etc.

Therefore, the waste treatment kits of the invention are capable of processing or decomposing various types of wastes in the liquid form and/or solid form. Also, the treatment kits of the invention can process the wastes and the generated liquid (by decomposing hydrocarbons and/or carbohydrates) that has a low boiling point and is flammable can be applied directly or further converted into biofuel or biomass energy source. That is, the treatment kits of the invention can be used as kits or part of the biomass energy conversion process.

Gas Processing Kit

Gas processing kit of the invention includes the above-mentioned composite photocatalyst. Referring to FIG. 9A to FIG. 9E, for gas processing or air purification purposes, the processing results of the gas processing kit containing the composite photocatalyst(s) of the invention are shown. Specifically, 0.86×$10^{-4}$ M of the composite photocatalyst solution is applied to coat the composite photocatalyst onto the inner wall of the sample bottle and dried, compared with the uncoated sample bottle, the gas processing effectiveness of the composite photocatalyst is evaluated. First, the polluted gas obtained from burning of the incense is collected into the sample bottle coated with composite photocatalyst (see FIG. 9A right side) and into the uncoated sample bottle (without the composite photocatalyst) (see FIG. 9A left side), followed by exposure to the sunlight for 5 seconds to 10 seconds. The results after exposure to the sunlight are shown in FIG. 9B (5 seconds) and FIG. 9C (10 seconds), and it is evident that the incense-burning polluted gas becomes clearer (visually the coated sample bottle becomes clearer and more transparent) and is successfully cleaned within the coated sample bottle. Besides, the similar results are observed in the experiments of FIG. 9D and FIG. 9E, such experiments are performed using the solar simulator source (AM1.5G solar simulator, YAMASHITA DENSO, YSS-E40; irradiation energy: 100 $mW/cm^2$) to irradiate the bottles but the other experiment conditions are the same, the experimental results prove that the exposure using the solar simulator can successfully produce comparable results when compared with the exposure of sunlight.

Gas processing kit of the invention can decompose organic pollutants in the air or gas within a short period of time and have excellent catalytic effects through the absorption of the visible light.

Bactericide Photocatalyst

In one embodiment form of the invention, the bactericide photocatalyst is the composite photocatalyst containing $Ag_2Fe_2O_4$ and platinum. Referring to FIG. 10A to FIG. 10D, the sanitization effect of the bactericide photocatalyst of the invention are evaluated. Specifically, the bactericide photocatalyst of the invention is added into the sample solution containing $10^6$ cfu/ml to $10^7$ cfu/ml of *E. coli*, and the concentration of the bactericide photocatalyst is set to be 1.5 μg/ml. At 37° C. in the darkroom, the sample solution added with the photocatalyst is compared with the sample solution without photocatalyst, and the results are shown in FIG. 10A and FIG. 10B. Referring to FIG. 10A and FIG. 10B, the sample solution without the bactericide photocatalyst appears to be cloudy and unclear (FIG. 10A), in comparison, the sample solution added with the bactericide photocatalyst appears to be clear and transparent, proving to be effectively antibacterial (FIG. 10B). Next, referring to FIG. 10C and FIG. 10D, further experiments are performed by adding 10 μl of the sample solution without the bactericide photocatalyst and 10 μl of the sample solution added with the bactericide photocatalyst respectively to the solid culture medium (the solid culture medium: one liter of the aqueous solution containing tryptone 10 grams, yeast extract 5 grams, sodium chloride 10 grams), and coated uniformly onto the solid culture medium until dry. The coated solid culture medium is placed inverted in the oven at 37° C. for 20 hours (overnight), and the solid medium is then taken out from the oven to calculate the number of the bacteria colonies on the solid culture media. The cultivation results are shown in FIG. 10C and FIG. 10D. In comparison to many $E.\ coli$ colonies are found on the solid culture medium treated with the sample solution without the bactericide photocatalyst (FIG. 10C), little or no $E.\ coli$ colonies are found on the solid culture medium treated with the sample solution added with the bactericide photocatalyst (FIG. 10D). From these results, it is found that even using a trace amount of the bactericide photocatalyst of the invention, excellent antiseptic effects can be achieved.

Therefore, the bactericide photocatalyst of the invention can achieve good bactericidal effects, and such effects can be achieved through the absorption of the visible light.

In summary, the composite photocatalyst of the invention can rapidly degrade pollutants without generating additional waste and have excellent catalytic effects from the absorption of the visible light. The composite photocatalyst of the invention has a wide range of applications, including wastewater or sewage treatment, solid waste treatment, gas processing and sterilization. Also, the composite photocatalyst of the invention is easy to prepare and easy to recycle by magnets.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed description.

What is claimed is:

1. A composite photocatalyst, comprising: platinum nanocrystals; and photocatalyst nanocrystals, wherein the photocatalyst nanocrystal includes a compound of chemical formula (1):

$$A^{2+}(B^{3+})_2 X_4 \quad \text{Chemical formula (1)}$$

wherein $A^{2+}$ represents $Zn^{2+}$, $Sn^{2+}$, $Cu^{2+}$, $Fe^{2+}$, $Mn^{2+}$, $Ni^{2+}$, $Co^{2+}$ or $Ag_2^{2+}$, $B^{3+}$ represents $Fe^{3+}$, $Mn^{3+}$ or $Cr^{3+}$, X represents $O^{2-}$, the composite photocatalyst absorbs a light in a visible light wavelength range to catalyze photo-catalysis, decomposition and degradation of an organic material containing carbon, hydrogen and oxygen.

2. The composite photocatalyst according to claim 1, wherein $B^{3+}$ represents $Fe^{3+}$.

3. The composite photocatalyst according to claim 2, wherein $A^{2+}$ represents $Zn^{2+}$.

4. The composite photocatalyst according to claim 2, wherein $A^{2+}$ represents $Ag_2^{2+}$.

5. The composite photocatalyst according to claim 1, wherein a molar ratio of platinum in the platinum nanocrystal and a metal A of $A^{2+}$ contained in the photocatalyst nanocrystal ranges from 0.01:1 to 0.2:1.

6. The composite photocatalyst according to claim 1, wherein a particle size of the photocatalyst nanocrystal ranges from 1 nm to 10 nm.

7. The composite photocatalyst according to claim 1, wherein a particle size of the platinum nanocrystal ranges from 2 nm to 3 nm.

8. The composite photocatalyst according to claim 1, wherein the composite photocatalyst absorbs the light in the visible light wavelength and under an environment having active oxide compounds to catalyze photo-catalysis, decomposition and degradation of the organic material containing carbon, hydrogen and oxygen, and the active oxide compounds include peroxides, super oxides or a combination thereof.

9. A wastewater treatment kit, comprising the composite photocatalyst according to claim 1 and active oxide compounds.

10. The wastewater treatment kit according to claim 9, wherein the active oxide compound includes peroxides, super oxide, or a combination thereof.

11. A method of manufacturing a composite photocatalyst, comprising:
mixing a first solution containing photocatalyst nanocrystals with a second solution containing platinum nanocrystals, wherein the photocatalyst nanocrystal includes a compound of chemical formula (1):

$$A^{2+}(B^{3+})_2 X_4 \quad \text{Chemical formula (1)}$$

wherein $A^{2+}$ represents $Zn^{2+}$, $Sn^{2+}$, $Cu^{2+}$, $Fe^{2+}$, $Mn^{2+}$, $Ni^{2+}$, $Co^{2+}$ or $Ag_2^{2+}$, $B^{3+}$ represents $Fe^{3+}$ or $Cr^{3+}$, X represents $O^{2-}$.

12. The method according to claim 11, wherein a preparation method of the photocatalyst nanocrystals comprises:
dissolving a first metal precursor and a second metal precursor in a first solvent to form a precursor solution, wherein a first metal of the first metal precursor includes Zn, Sn, Cu, Fe, Mn, Ni, Co or Ag, and a second metal of the second metal precursor includes Fe, Mn or Cr;
adding a second solvent to the precursor solution and uniformly mixing to form a first mixture solution, wherein the second solvent is miscible with the first solvent;
adding a third solvent to the first mixture solution to form a layered solution, wherein the third solvent is immiscible with the second solvent, and an affinity between the third solvent and the first solvent is greater than an affinity between the second solvent and the first solvent;
stirring the layered solution, so the precursor solution of the first mixture solution is dissolved with the third solvent to form a second mixture solution containing the photocatalyst nanocrystals; and
centrifuging the second mixture solution.

13. The method according to claim 12, wherein in the layered solution, the third solvent is located at an upper layer of the layered solution, and the first mixture solution is located at a lower layer of the layered solution.

14. The method according to claim 11, wherein $B^{3+}$ represents $Fe^{3+}$, and the second metal precursor is a trivalent iron compound.

15. The method according to claim 11, wherein a molar ratio of platinum in the platinum nanocrystal in the second solution and a metal A of $A^{2+}$ containing in the photocatalyst nanocrystal ranges from 0.01:1 to 0.2:1.

16. A solid waste treatment kit, comprising a photocatalyst, wherein the photocatalyst is a composite photocatalyst comprising platinum nanocrystals and photocatalyst nanocrystals or the photocatalyst includes photocatalyst nanocrystals, wherein the photocatalyst absorbs a light in a visible light wavelength range to catalyze photo-catalysis, decomposition and degradation of an organic material containing carbon, hydrogen and oxygen, and the photocatalyst nanocrystal includes a compound of chemical formula (1):

$$A^{2+}(B^{3+})_2 X_4 \qquad \text{Chemical formula (1)}$$

wherein $A^{2+}$ represents $Zn^{2+}$, $Sn^{2+}$, $Cu^{2+}$, $Fe^{2+}$, $Mn^{2+}$, $Ni^{2+}$, $Co^{2+}$ or $Ag_2^{2+}$, $B^{3+}$ represents $Fe^{3+}$, $Mn^{3+}$ or $Cr^{3+}$, X represents $O^{2-}$.

17. The solid waste treatment kit according to claim 16, wherein the organic material containing carbon, hydrogen, and oxygen includes hydrocarbons, carbohydrates or a combination thereof, and the organic material containing carbon, hydrogen, and oxygen is decomposed and degraded by the photocatalyst into alkanes, alcohols, or a combination thereof.

18. A gas processing kit, comprising a photocatalyst, wherein the photocatalyst is a composite photocatalyst comprising platinum nanocrystals and photocatalyst nanocrystals or the photocatalyst includes photocatalyst nanocrystals, wherein the photocatalyst absorbs a light in a visible light wavelength range to catalyze photo-catalysis, decomposition and degradation of an organic material containing carbon, hydrogen and oxygen, wherein the photocatalyst nanocrystal includes a compound of chemical formula (1):

$$A^{2+}(B^{3+})_2 X_4 \qquad \text{Chemical formula (1)}$$

wherein $A^{2+}$ represents $Zn^{2+}$, $Sn^{2+}$, $Cu^{2+}$, $Fe^{2+}$, $Mn^{2+}$, $Ni^{2+}$, $Co^{2+}$ or $Ag_2^{2+}$, $B^{3+}$ represents $Fe^{3+}$, $Mn^{3+}$ or $Cr^{3+}$, X represents $O^{2-}$.

19. A bactericide photocatalyst, wherein the bactericide photocatalyst comprises a composite photocatalyst comprising platinum nanocrystals and photocatalyst nanocrystals or the bactericide photocatalyst includes photocatalyst nanocrystals, wherein the photocatalyst nanocrystal comprises $Ag_2Fe_2O_4$.

* * * * *